March 3, 1931.                J. A. GARELL                1,794,762
                         CIRCUIT CONTROLLING DEVICE
                         Filed Oct. 9, 1925      3 Sheets-Sheet 1
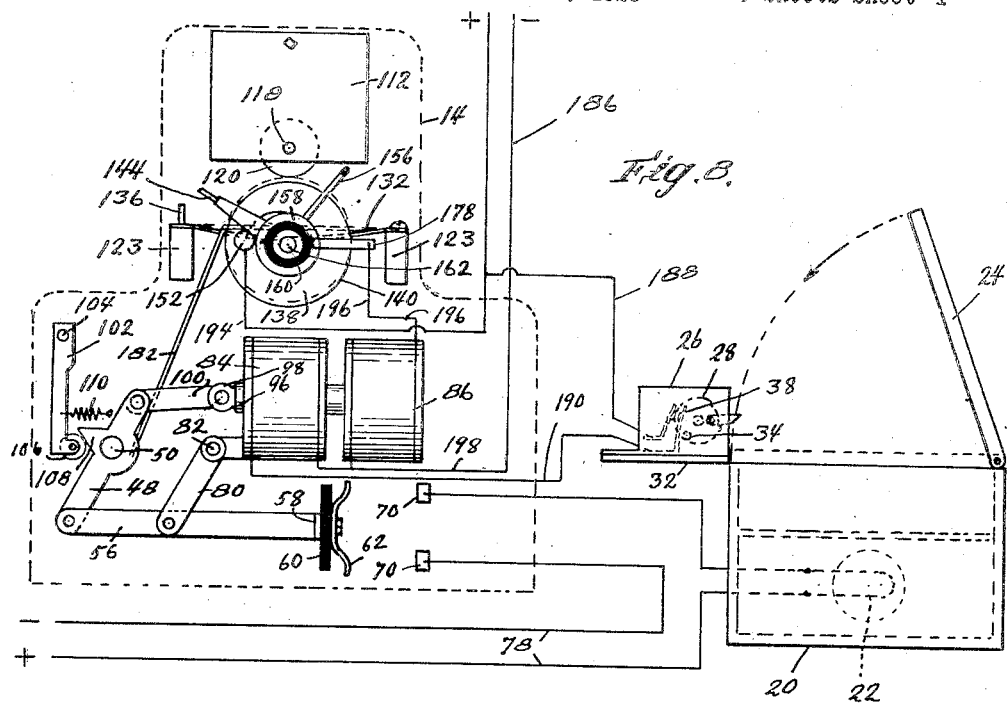
Fig. 8.
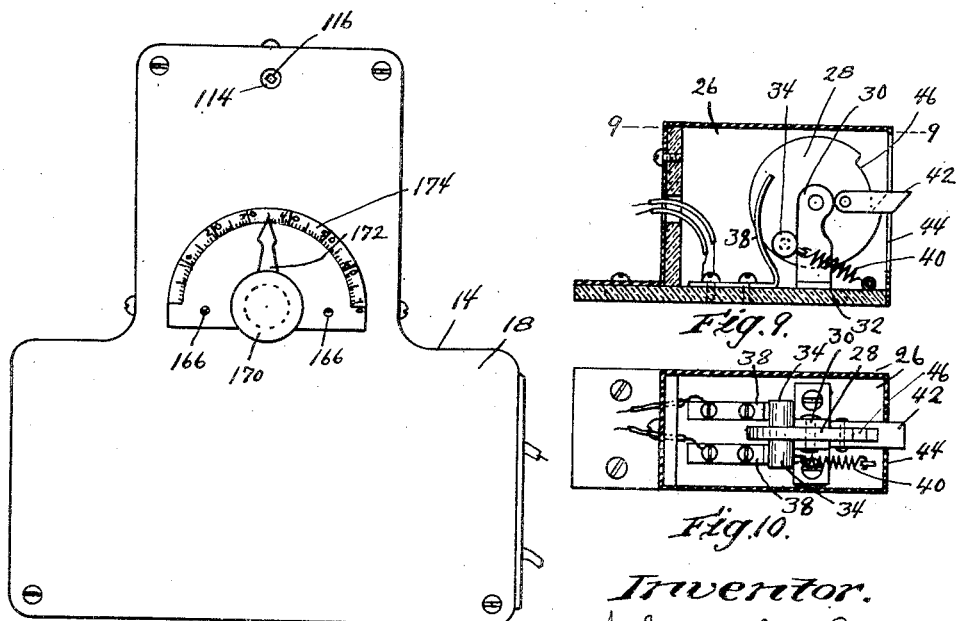
Fig. 1.    Fig. 9.    Fig. 10.
Inventor.
John Albert Garell
by
atty March 3, 1931.  J. A. GARELL  1,794,762
CIRCUIT CONTROLLING DEVICE
Filed Oct. 9, 1925   3 Sheets-Sheet 2
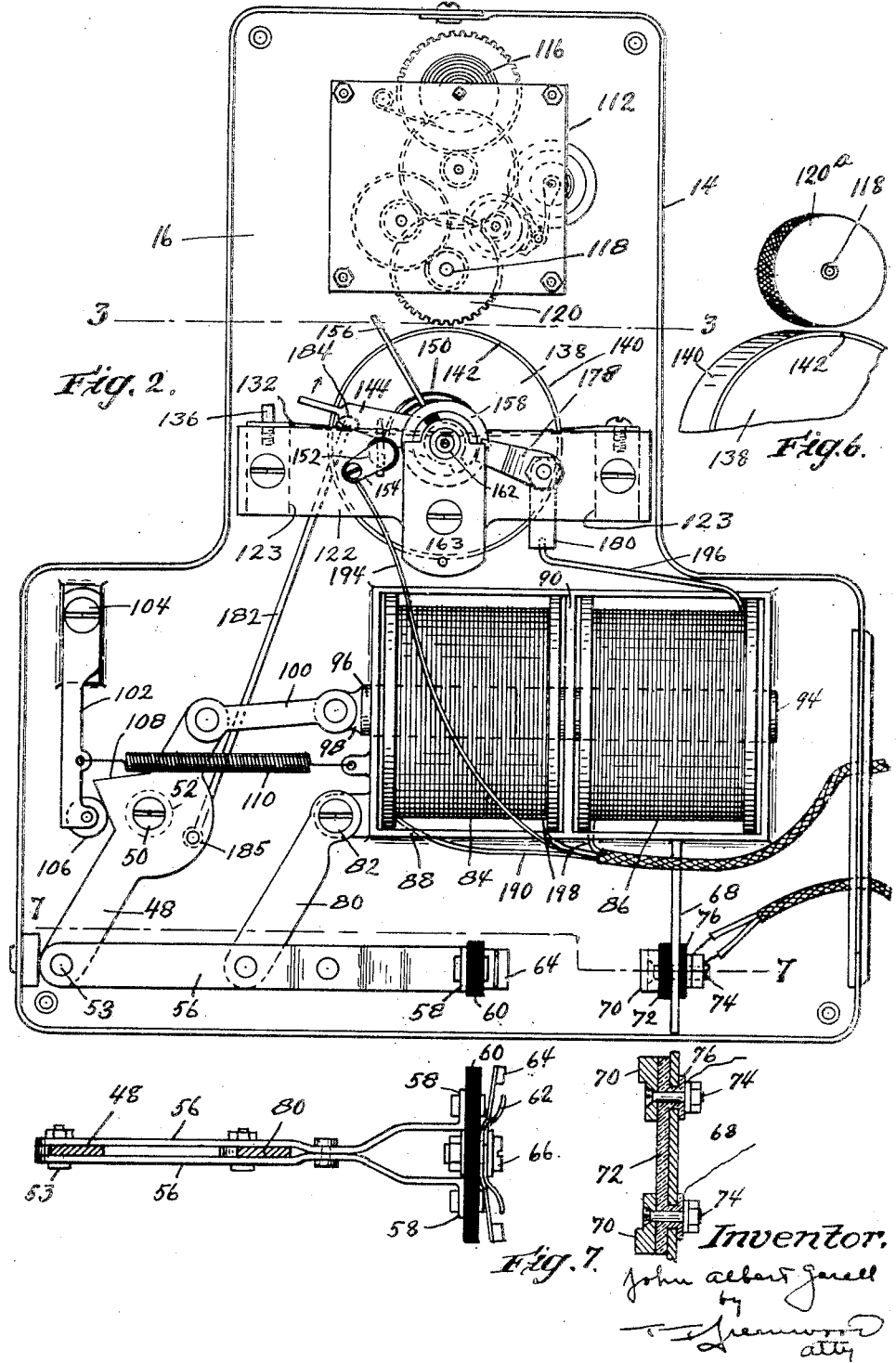
Inventor.
John Albert Garell
by
[signature] atty

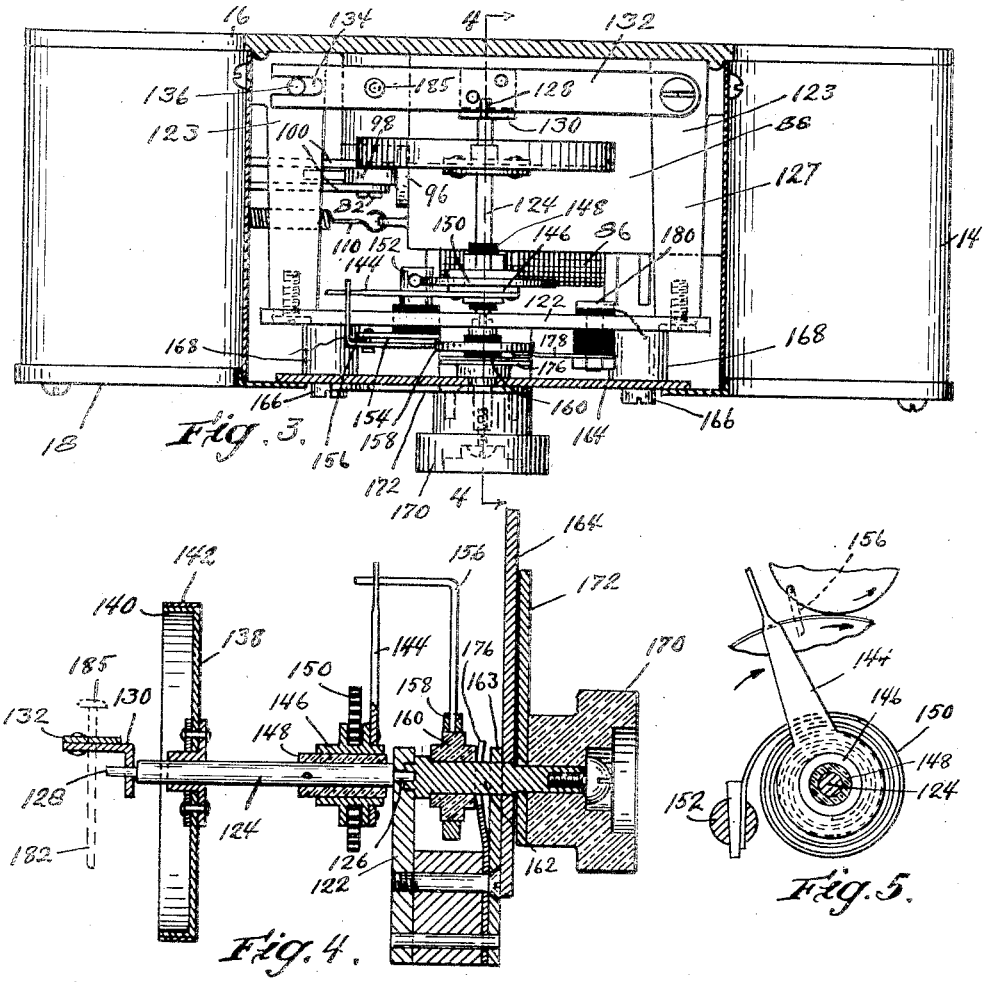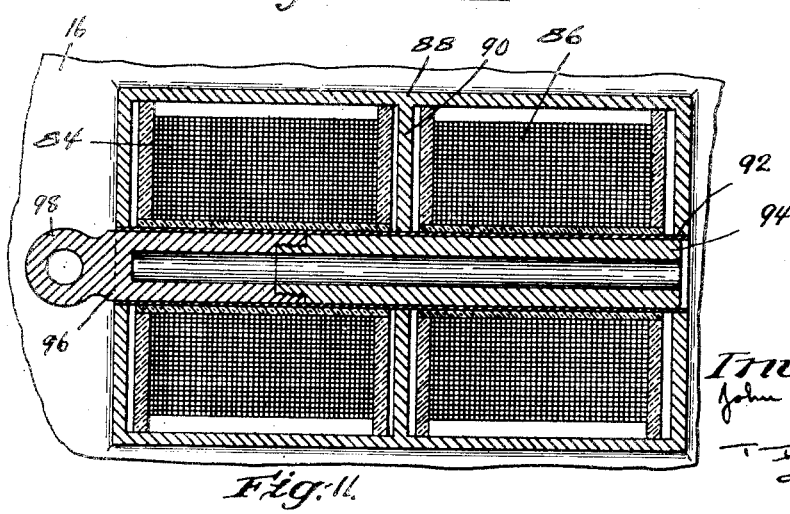

Patented Mar. 3, 1931

1,794,762

UNITED STATES PATENT OFFICE

JOHN ALBERT GARELL, OF GARDNER, MASSACHUSETTS, ASSIGNOR TO GARDNER SCREW CORP., OF GARDNER, MASSACHUSETTS, A CORPORATION OF MASSACHUSETTS

CIRCUIT-CONTROLLING DEVICE

Application filed October 9, 1925. Serial No. 61,550.

This invention relates to apparatus and systems for closing and interrupting an electric circuit and for governing the period of time during which the circuit remains closed; and has particular reference to photographic printing, wherein the electric circuit to be controlled includes a source of light to which the negative and sensitized sheet are exposed, although the invention is not necessarily restricted to such use.

For the printing of photographs by artificial light and as a commercial operation, it is highly essential that each print made from the same negative be given exactly the same time of exposure to light in order that uniform prints be assured. In the commercial printing of photographs, it is also highly desirable that the printing operation be performed automatically so that an attendant may perform other duties while prints are being exposed. It is, therefore, an object of this invention to provide means which automatically governs the length of exposure of a sensitized sheet and the negative to a source of illumination and automatically extinguishes the source of illumination at the expiration of any selected period of time for which the means may be set.

A further object of the invention is to provide the aforesaid apparatus with means whereby the time period of exposure to the source of illumination may be adjusted within wide limits.

In photographic printing, the source of illumination is generally one or more electric lights, which lights are contained in a cabinet beneath a glass plate which forms one wall of the cabinet. The negative and the sensitized sheet are adapted to be placed upon the glass plate. The cabinet is provided with a cover which is adapted to close upon the glass plate and hold the negative and the sensitized sheet firmly in contact during the printing operation. It is a further object of this invention to provide means actuated upon the closing of the cover to complete the electric circuit through the lights and simultaneously to set into operation timing mechanism which, at the expiration of any selected period of time for which it may be set, effects the interruption of the electric circuit through the lights, thereby to extinguish them and complete the period of exposure. The mechanism is then rendered inoperative and the cover then may be raised and a fresh sensitized sheet placed therein and the cover again closed, upon which closing a second printing operation will take place.

A further object of the invention is generally to improve photographic printing processes and apparatus.

Fig. 1 is a front elevation of the timing and circuit controlling device embodying the invention.

Fig. 2 is a front elevation of the mechanism contained within the casing of Fig. 1, the cover being removed.

Fig. 3 is a section along line 3—3 of Fig. 2 and illustrating more particularly the circuit controlling elements of the timing mechanism.

Fig. 4 is a section along line 4—4 of Fig. 3.

Fig. 5 is a detail of the spring which governs the resetting of the movable contact member of the timing mechanism.

Fig. 6 is a perspective detail illustrating a modified form of driving wheel for the circuit controlling mechanism.

Fig. 7 is a section along line 7—7 of Fig. 2 and illustrating more particularly the construction of the circuit interrupter.

Fig. 8 is a diagrammatic respresentation of the various elements of the device and the electric circuits associated therewith.

Fig. 9 is a sectional elevation through the circuit controller associated with the door of the printing cabinet.

Fig. 10 is a plan view of the door circuit controller taken along line 9—9 of Fig. 8.

Fig. 11 is a plan section through the operating solenoids for the circuit interrupter.

As here shown, the timing and circuit controlling mechanism embodying my invention is contained within a case 14 which case includes a back plate 16 and a removable cover 18, see Fig. 3. Said mechanism may be located in any convenient position relative to the photographic printing cabinet 20, Fig. 8. Said cabinet is provided with a source of illumination which may be one or more electric lights 22 disposed in the bottom of the cabinet. The cabinet is provided with a cover 24 which is adapted to close upon the negative and its superimposed sensitized sheet. The closing of the cover is adapted to effect the actuation of the timing and circuit interrupting mechanism whereby to complete the circuit for the electric light and subsequently to interrupt the circuit at the end of any selected period of time for which the apparatus may be set.

The apparatus is started in operation by means of a cabinet circuit controller 26 which is adapted to be disposed in any suitable position adjacent or on the cabinet and in position to be actuated by the closing movement of the cover and preferably by the last portion of the closing movement. The cabinet circuit controller may be of any suitable construction but preferably is such as momentarily to close and then interrupt the circuit. To this end, the controller comprises a rotatable disc 28 which is pivotally mounted between arms 30 which extend upwardly from a supporting base 32. Said disc 28 carries rollers 34 which are adapted to be moved into electrical engagement with contact springs 38 secured to said base 32 when said disc is rotated. Said disc and its rollers are normally held in the circuit-open position shown in Fig. 8 by means of a retractile spring 40. An operating latch 42 is pivoted to said disc and extends outwardly through a slot in the cover 44. Said latch operates in a notch 46 in said disc and is so arranged as normally to be held by gravity against the lower wall of said disc as illustrated in Fig. 8. The controller may be positioned as shown in Fig. 7 in such a manner that when the cover 24 of the cabinet is moved to closed position, it will engage with the upper face of said latch and depress it and consequently rotate the disc sufficiently to bring the rollers 34 into bridging relation with the stationary contact springs 38, thereby to complete the circuit through the controller. The cover is adapted to ride over and pass below said latch 42 during continued movement of the cover thereby to release the disc. The spring 40 then becomes effective to rotate the disc 28 in the opposite direction to break the circuit through the contact springs 38. The latch is so arranged that it permits upward movement of the cover without effecting movement of the disc 28 and, consequently, without again closing the circuit. The completion of the circuit through the cabinet circuit controller effects the operation of the timing mechanism in a manner hereinafter to be set forth.

The timing and circuit controlling mechanism comprises a circuit interrupter or switch which is adapted, upon the closing of the cabinet cover, to close the circuit for the electric lights 22 and thereby illuminate them. The circuit interrupter is also governed by a timing mechanism hereinafter to be described which operates subsequently to open the interrupter and thereby extinguish the lights.

The circuit interrupter is contained within the casing 14 and is mounted upon the base plate 16 thereof. Said circuit interrupter includes a lever 48 which is pivotally mounted on a screw 50 secured to a boss 52 rising from the base plate 16, see Fig. 2. A movable switch member is pivoted at 53 to the lower end of said lever. Said movable switch member includes a pair of spaced bars 56 between and at proximate ends of which said lever 48 is disposed. The opposite ends of said bars are reflexed outwardly to form feet 58 to which an insulating plate 60 is secured. A bridging member comprising one or more resilient current-carrying members 62, and auxiliary arcing members 64, is secured to said insulating plate 60 by suitable means as the screw 66. Said insulating plate 60 serves to insulate the bridging and arcing members from the bars 56. The cooperating stationary switch members are carried by a plate 68 which is here shown as integral with the base plate 16 and is disposed in the line of movement of the movable switch member. The stationary switch members comprise contact blocks 70 which are disposed to be engaged by the opposite ends of the movable current-carrying and arcing members. Said contact blocks 70 are disposed upon an insulating plate 72 and are secured to said plate and to the plate 68 by means of screws 74 and interposed insulating bushings 76. Said plate 72 and bushings 76 serve to insulate said block from the plate 72. Said stationary contact members are in the circuit 78 which includes the electric lights 22 in the photograph cabinet and the circuit leads may pass outwardly through the side wall of the casing in any convenient manner.

The movable switch member is guided for movement between circuit-opening and circuit-closing position in approximately a straight line by means including a guide link 80. Said guide link is disposed between and is pivoted to said bars 56 of the movable switch member intermediate the ends thereof. The upper end of said link 80 is pivoted at 82 to the supporting base 16 and approximately in line with the pivot 50 for the switch lever 48. The arrangement is such that said lever 48 and guide link 80 are approximately parallel to each other in all positions they may occupy, so that the movable switch member is moved between open and closed position in parallel lines.

The circuit controller is actuated electrically by means including a closing solenoid 84 and an opening solenoid 86. Said solenoids are disposed in axial alignment and are contained within a housing 88, which housing is integral with the supporting base 16 and is composed of magnetic material, as iron, and thereby forms a magnetic circuit for said solenoids or coils as is more clearly shown in Fig. 11. The housing includes an integral plate 90 which is disposed between the solenoids in such a manner that said plate is included in the magnetic circuit of each coil. Said housing is provided with aligned apertures and a tube 92, composed of brass or other non-magnetic material, is passed through said aligned apertures and also through the solenoids. A core or plunger 94 is movably received within said tube. Said plunger may be hollow as here shown, or otherwise formed, and is composed of magnetic material as iron. Said core is preferably of a length sufficient to extend completely through one solenoid and partly into the other solenoid and is adapted to be moved alternately between both solenoids. A head 96, composed preferably of brass or other non-magnetic material, is secured to one end of said plunger. The outer end of said head is provided with an eye 98. A link 100 is pivotally connected with said eye 98 and also with the upper end of said switch lever 48. It is apparent that if said core is moved alternately towards the left and the right within the solenoids, the circuit interrupter will be closed and opened.

Means are provided to hold the circuit interrupter positively in closed and open positions until positively moved therefrom by the solenoids. Said means includes a lever 102 which is pivoted on a screw 104 secured in a boss rising from the supporting base 16. A cam-roller 106 is pivoted to the free end of said lever and is adapted to ride over a cam-projection 108 carried by the switch lever 48 adjacent its pivotal support. A retractile spring 110 serves constantly to urge said lever 102 towards said switch lever and thereby to maintain the roller in engagement with the cam. The arrangement is such that the cam roller is held with substantial pressure against one or the other faces of the cam projection 108, thereby to hold the movable switch member in either position it may occupy, although the solenoids are adapted to have sufficient strength to move the switch member in either direction against the action of the cam and cam roller. The arrangement is also such that, after the switch lever 48 has been moved sufficiently to bring the cam projection definitely to one or the other side of the cam roller, the action of the spring 110 serves to effect further movement of the switch lever in the same direction without regard to the solenoids and thereby provides for a positive closing and positive opening of the switch.

The circuit interrupter above described is also controlled by timing mechanism which operates to energize the opening solenoid 86 to effect the opening of the circuit interrupter at the expiration of some predetermined time after it has been closed. The timing mechanism is disposed in the upper part of the enclosing casing 14. It includes a driving mechanism 112 which is here shown as a simple clock mechanism, which is adapted to operate continuously, and may be wound from time to time by means of a key extended into an opening 114 in the casing and engaging the square end of the winding shaft 116. The driving mechanism may be of any suitable construction characterized by driving a shaft 118 continuously at some constant speed. The shaft 118 is provided with an exposed wheel 120 which, as shown in Fig. 2, may comprise a gear wheel or, as shown in Fig. 6, may comprise a wheel 120a having a knurled periphery. Said timing mechanism, through said wheel 120, is adapted to drive the movable element of a circuit controller which is adapted to energize the closing solenoid and open the interrupter. Said circuit controller includes a supporting plate 122 which is extended transversely across the casing and is supported in the front part thereof on lugs 123 which extend upwardly from the supporting base 16. A shaft 124 has a reduced end 126 which is journalled loosely in said plate. The other end of said shaft has a reduced end extension 128 which is journalled in a bracket 130. Said bracket is secured to the intermediate portion of a spring-support which may comprise essentially a spring plate 132. Said spring plate is secured at one end of one of said lugs 123. The free end of said spring plate is disposed over said other lug and is provided with a guide slot 134 into which is disposed a guide pin 136 which extends upwardly above and is fixed in said lug. A driven timing wheel 138 is fixed to said shaft 124. Said timing wheel is provided with a relatively broad face 140 which, if desired, may be covered with some relatively soft and yielding material as a thin strip of leather 142 or the equivalent. Said wheel is adapted to be moved upwardly to bring its periphery into driving engagement with the wheel 120 of the driving mechanism in a manner hereinafter to be described. Said shaft 124 is also provided with a contact arm 144 which is adapted to form one of the contact members of the circuit controller. Said contact arm is secured to a hub 146 which latter is secured upon an insulating sleeve 148 fixed to said shaft 124 and driven thereby. Said contact arm and its associated mechanism are adapted to be returned from an operated position to an initial and circuit-open position by means including a spiral spring 150. Said spring is coiled about the hub 146 and has its inner end secured thereto. The outer end of said spring is wedged adjustably within an opening in a post 152 in a more or less common manner. Said post 152 is extended through said supporting plate 122 and is insulated therefrom and is provided with a terminal connector 154 to which a circuit lead is adapted to be connected. Said post also serves as a stop member against which said contact arm 144 is adapted to rest in the normal and unoperated position thereof. A stationary, although adjustable, contact arm 156 cooperates with the movable contact arm 144 to complete the circuit through the opening coil of the circuit interrupter. Said adjustable contact arm is secured in a ring 158 fixed to an insulating bushing 160. Said bushing is fixed to a shaft 162 which is journalled in the plate 122 and also in a plate 163 carried by the aforesaid plate and spaced forwardly thereof. A dial 164 is secured to said supporting plate 122 by screws 166 and interposed spacing blocks 168 and in position in front of said adjustable contact arm. Said shaft 162 is passed loosely through said dial and is provided at its outer end with a knob 170 and a pointer 172, which pointer is adapted to ride over said dial.

The rotation of said knob 170 serves to rotate said adjustable contact arm 156 concentrically about said movable contact arm 144 thereby to vary the spacing therebetween and consequently to vary the time required for said movable contact arm to move into contact with the adjustable arm. Said dial may be provided with a series of indicia 174 which may indicate seconds of exposure of the sensitized sheet in the photograph cabinet. A spring 176 is disposed to bear against said insulated hub 160 whereby to maintain said arm fixed in any adjusted position thereof. A contact spring 178 is adapted to bear against the ring 158 of the movable contact arm and maintain electrical connection therewith in any set position of the contact arm. Said contact finger is carried by and electrically insulated from said supporting plate 122 and is provided with a connecting terminal 180 to which one of the circuit leads for the opening solenoid is adapted to be secured.

The spring plate 132 which supports one end of the shaft 124 is adapted to be flexed in such a manner as to urge the timing wheel 138 constantly toward the driving wheel 120 of the timing mechanism. The circuit interrupter is provided with means to control such driving engagement. Said means includes a link 182 which is pivoted at its lower end on a pin 184 secured to the operating lever 48 of the circuit interrupter and adjacent, although eccentrically, of the pivotal support for said operating lever. The upper end of said link is extended loosely through an aperture in said spring plate 132 and is provided with an enlarged head 185. The arrangement is such that when the circuit interrupter is in open position, as shown in Fig. 2, the position of the switch lever 48 is such as to maintain the head 185 of said link against said spring plate 132 whereby to draw said spring plate down and hold it against its lug 123 and thereby maintain the disc 138 free from driving engagement with the continuously rotating driving wheel 120. When the closing solenoid 84 is actuated to close the interrupter, the movement of said operating lever 158 in a switch closing direction serves to move said link upwardly, thereby to position the enlarged head of said link above the spring plate 132 and, consequently, to permit said spring plate to move the driving disc 138 into engagement with the wheel 120.

When said disc 138 has been moved into driving engagement with said driving wheel 120, the contact arm 144 is consequently advanced slowly toward the adjustable contact arm 156 and, after a period of time which is variable and depends upon the setting of said adjustable contact arm, said movable arm is moved into electrical engagement with said adjustable contact arm and consequently energizes the opening solenoid 86. Said opening solenoid immediately effects the opening of the interrupter with the consequent movement of the lever 48. Such movement of the lever 48 serves to move said rod 182 downwardly and thereby to remove the timing disc 138 from its driving connection with the driving wheel 120. The spiral spring 150 thereupon serves to return said movable contact member 144 rapidly to its original position, or re-sets it, and thereby separates the contact members and effects the interruption of the circuit through the opening solenoid 86.

The various control circuits are clearly illustrated in Fig. 7. The control circuit for the electric circuit interrupter has been previously described. The cabinet circuit controller 26 serves to control the closing solenoid 84 from the power mains 186 through the circuit leads 188, 190, 192 in an obvious manner. The circuit through the opening coil 86 is controlled from the power main and the timing contact arms 144 and 156 through a circuit lead 194 which is connected to the movable contact arm, a circuit lead 196, which is connected to the adjustable contact arm, and the circuit lead 198.

As thus arranged, the closing of the cabinet cover 26 serves to energize the above described apparatus and to complete the circuit through the electric lights in the cabinet and also simultaneously to start the operation of the timing mechanism. The timing mechanism continues to operate for a period of time determined by the setting of the adjustable contact member and then operates to open the circuit through the electric lights whereby to terminate the exposure of the sensitized sheet. Various periods of exposure may be obtained by varying the setting of the adjustable contact member by means of the knob 170 and its pointer 172 which are exposed at the front of the enclosing casing.

The arrangement may be otherwise modified without departing from the spirit of the invention.

I claim:

1. The combination of a circuit interrupter, a timing device arranged to govern the time during which the interrupter remains closed, and means to close the circuit interrupter and simultaneously start the timing device in operation including an actuating member movable in one direction to effect the operation of the circuit interrupter and timing device and movable in the opposite direction free from control of the circuit interrupter and timing device, said actuating member characterized by being inoperative to control the timing device while the interrupter is closed.

2. The combination of a circuit-interrupter, means including a timing device arranged to open said interrupter at the expiration of a predetermined time period after it has closed, means including a circuit-controller arranged to close said interrupter, and means governed by said interrupter during its closing movement to start said timing device.

3. A circuit interrupter having opening and closing mechanism, a timing device arranged to actuate said mechanism to open the interrupter at the expiration of a predetermined time period after it has closed, said timing device having starting and stopping mechanism, and means operated by said interrupter-mechanism to control said starting and stopping mechanism including a link mechanically connecting said two mechanisms.

4. A circuit interrupter having opening and closing mechanism, a timing device arranged to actuate said mechanism to open the interrupter at the expiration of a predetermined time period after it has closed, said timing device having separable driving and driven members, and means controlled by said interrupter-mechanism during its operation of the interrupter arranged to control the connection between said driving and driven members.

5. A circuit interrupter having opening and closing mechanism, a timing device arranged to actuate said mechanism to open the interrupter at the expiration of a predetermined time period after it has closed, said timing device having separable driving and driven members, and means actuated by the closing movement of said interrupter-mechanism to connect said driving and driven members.

6. The combination of a circuit-interrupter, a timing device therefor arranged to open the interrupter at the expiration of a predetermined time after it has been closed, said timing device having a continuously-operable driving mechanism, a timing member independent of and arranged to control the opening of the interrupter and having a releasable driving connection with said driving mechanism, means to close the interrupter and simultaneously connect said timing member with said driving mechanism, and means operated by said interrupter at the opening movement thereof to disconnect said timing member from said driving mechanism.

7. The combination of a circuit-interrupter, a timing device therefor arranged to open the interrupter at the expiration of a predetermined time after it has been closed, said timing device having a continuously-operable driving mechanism, a timing member independent of and arranged to control the opening of the interrupter and having a releasable driving connection with said driving mechanism, and means operated by said interrupter at the closing and opening movements thereof to connect said timing member with and disconnect it from said driving mechanism.

8. The combination of a circuit-interrupter, a timing device therefor including a continuously-operable driving mechanism and a timing member independent of said interrupter arranged for releasable connection with said driving mechanism to effect the opening of said interrupter at the expiration of a predetermined time period after its connection with said driving mechanism, means to close said interrupter, and means operated by the interrupter to connect said timing member with said driving mechanism.

9. A circuit interrupter having the combination of operating mechanism for opening and closing it, a timing device including a continuously-operable driving mechanism, a timing member arranged for releasable connection with said driving mechanism and having means to operate said operating mechanism and effect the opening of said interrupter at the expiration of a predetermined time period after its connection with said driving mechanism, and means associated with and operated by said interrupter operating mechanism to control the connection between said driving mechanism and timing member.

10. A circuit interrupter having operating mechanism, means including a circuit-controller controlling said operating mechanism, a timing device arranged to control the time during which the interrupter remains closed, said timing device having a driving wheel having control of said circuit controller, and a driven timing wheel, means to effect the driving engagement of said wheels and simultaneously close said interrupter.

11. A circuit interrupter having operating mechanism including opening and closing coils, a circuit-controller arranged to energize said closing coil, and automatic means including a timing device adapted to be set in operation at the closing of the interrupter to subsequently energize the opening coil independently of said circuit controller.

12. A circuit interrupter having operating mechanism including opening and closing coils, a circuit-controller arranged to energize said closing coil, and an automatic circuit controller having time-delayed operating mechanism set in operation by the closing movement of the interrupter arranged to energize the opening coil independently of said first mentioned circuit controller.

13. A circuit interrupter having time-controlled operating mechanism, a timing device controlling the opening of the interrupter including a driving wheel, a driven timing wheel, and means actuated by said interrupter operating mechanism to control the driving engagement between said wheels.

14. A circuit interrupter having time-controlled operating mechanism, a timing device controlling the opening of the interrupter including a driving wheel, a driven wheel having means urging it for radial movement toward engagement with the periphery of said driving wheel, and means controlled by said interrupter operating mechanism to govern such driving engagement.

15. A circuit controller having operating mechanism, a timing device controlling the opening of the interrupter, including a driving wheel, a driven wheel having means urging it for radial movement toward engagement with the periphery of said driving wheel, and means connecting said urging means with said interrupter operating mechanism for control thereby.

16. A circuit controller having operating mechanism, a timing device controlling the opening of the interrupter including a driving wheel, a driven timing wheel, means including a spring-support for said timing wheel arranged to urge it for radial movement toward said driving wheel for engagement with the periphery thereof, and means connecting said spring-support with said interrupter operating mechanism for control thereby.

17. A circuit interrupter having operating mechanism, a timing device controlling the opening of the interrupter including a driving wheel, a driven timing wheel, means including a spring-support for said timing wheel arranged to normally urge it toward said driving wheel, and means including a lost motion connection between said spring-support and said operating mechanism for preventing engagement between said wheels when the interrupter is open.

18. A circuit interrupter having operating mechanism, a timing device controlling the opening of the interrupter including a driving wheel, a driven timing wheel, means including a spring-support for said timing wheel arranged to urge it toward said driving wheel, and a connection between said spring-support and said operating mechanism arranged to hold said wheels out of engagement when the interrupter is open and to permit driving engagement between said wheels when the interrupter is closed.

19. A circuit interrupter having operating mechanism, a timing device controlling the opening of the interrupter including a driving wheel, a driven timing wheel having a shaft on which it is mounted, a fixed support in which one end of said shaft is journalled loosely, a movable support for the other end of said shaft, said support normally biased to bring said driving and driven wheels into engagement when the interrupter is closed, and means restraining the engagement of said driving and driven wheels when the interrupter is open.

20. A circuit interrupter having operating mechanism, a timing device controlling the opening of the interrupter including a driving wheel, a driven timing wheel having a shaft on which it is mounted, a fixed support in which one end of said shaft is journalled loosely, a spring-support for the other end of said shaft arranged to urge said timing wheel constantly toward engagement with said driving wheel, and a connection between said spring-support and said operating mechanism arranged to control such driving engagement.

21. A circuit interrupter having operating mechanism, a timing device controlling the opening of the interrupter including a driving wheel, a driven timing wheel having a shaft on which it is mounted, a fixed support in which one end of said shaft is journalled loosely, a spring-support for the other end of said shaft arranged to urge said timing wheel constantly toward engagement with said driving wheel, and a loose connection between said spring-support and said operating mechanism arranged to hold said spring-support from establishing such driving engagement when the interrupter is open and to release said spring-support for such driving engagement when the interrupter is closed.

22. The combination of a circuit interrupter having operating mechanism, a timing device arranged to control the extent of time during which the interrupter is closed, said timing device including a continuously-rotatable driving wheel, a timing wheel adapted to be driven by said driving wheel, a shaft on which said timing wheel is mounted, a spring-support for said shaft arranged to urge it toward said driving wheel, contact-members controlled by said timing wheel and arranged to control said operating mechanism to open the circuit interrupter, means connecting said spring-support with said operating mechanism and arranged to raise and lower it as said mechanism is operated between closed and open positions, and means independent of said contact members to control said operating mechanism to close the circuit interrupter.

23. The combination of a circuit-interrupter, means for closing and opening the interrupter, timing means to control the duration of the period of closure of said interrupter, means operated by the interrupter when it closes and opens, to throw said timing means into and out of operation, and adjustable means for predetermining the duration of the period of operation of said timing means.

24. The combination of a circuit-interrupter, means for closing and opening the interrupter, timing means to control the duration of the period of closure of said interrupter, means operated by the interrupter when it closes and opens, to throw said timing means into and out of operation, adjustable means for predetermining the duration of the period of operation of said timing means and separate means for actuating the closing means of the circuit-interrupter, whereby the means for predetermining the period of duration of the timing means may be adjusted before closing the circuit-interrupter.

In testimony whereof, I have signed my name to this specification.

JOHN ALBERT GARELL.